United States Patent [19]
Kitamura

[11] Patent Number: 5,774,594
[45] Date of Patent: Jun. 30, 1998

[54] SIGNAL COMPRESSION DEVICE

[75] Inventor: Takuya Kitamura, Kanagawa, Japan

[73] Assignee: Sony Corporation, Tokyo, Japan

[21] Appl. No.: 670,777

[22] Filed: Jun. 20, 1996

[30] Foreign Application Priority Data

Jun. 22, 1995 [JP] Japan ..................... 7-156313

[51] Int. Cl.[6] ................ G06K 9/36; G06K 9/46
[52] U.S. Cl. .............. 382/239; 382/232; 382/248
[58] Field of Search ................... 358/433, 432; 382/239, 240, 250, 248, 232

[56] References Cited

U.S. PATENT DOCUMENTS 5,416,604  5/1995  Park ........................ 358/433
5,553,160  9/1996  Dawson ................... 382/166

*Primary Examiner*—Jose L. Couso
*Assistant Examiner*—Dmitry A. Novik
*Attorney, Agent, or Firm*—Frommer Lawrence & Haug LLP; William S. Frommer

[57] ABSTRACT

Blocking means subjects pixel information of an original sample surface to blocking, a DCT circuit transforms the blocks of input data, a quantizer quantizes the DCT-treated data, a VLC circuit subjects the quantized data to variable-length coding, and a measuring circuit measures the code length based on the quantized data. Variable-length coded data or input sample data is selected in accordance with an output from the measuring circuit so that when the variable-length code content after entropy coding is greater than the data content of unit input sample surface, the input sample data itself, instead of the variable-length coded data, may used as data to be compressed, whereby the average code content is reduced.

8 Claims, 9 Drawing Sheets

FIG. 4

| f(0,0) | f(0,1) | f(0,2) | f(0,3) | f(0,4) | f(0,5) | f(0,6) | f(0,7) |
|---|---|---|---|---|---|---|---|
| f(1,0) | f(1,1) | f(1,2) | f(1,3) | f(1,4) | f(1,5) | f(1,6) | f(1,7) |
| f(2,0) | f(2,1) | f(2,2) | f(2,3) | f(2,4) | f(2,5) | f(2,6) | f(2,7) |
| f(3,0) | f(3,1) | f(3,2) | f(3,3) | f(3,4) | f(3,5) | f(3,6) | f(3,7) |
| f(4,0) | f(4,1) | f(4,2) | f(4,3) | f(4,4) | f(4,5) | f(4,6) | f(4,7) |
| f(5,0) | f(5,1) | f(5,2) | f(5,3) | f(5,4) | f(5,5) | f(5,6) | f(5,7) |
| f(6,0) | f(6,1) | f(6,2) | f(6,3) | f(6,4) | f(6,5) | f(6,6) | f(6,7) |
| f(7,0) | f(7,1) | f(7,2) | f(7,3) | f(7,4) | f(7,5) | f(7,6) | f(7,7) |

DCT ↓   ↑ IDCT

| F(0,0) | F(0,1) | F(0,2) | F(0,3) | F(0,4) | F(0,5) | F(0,6) | F(0,7) |
|---|---|---|---|---|---|---|---|
| F(1,0) | F(1,1) | F(1,2) | F(1,3) | F(1,4) | F(1,5) | F(1,6) | F(1,7) |
| F(2,0) | F(2,1) | F(2,2) | F(2,3) | F(2,4) | F(2,5) | F(2,6) | F(2,7) |
| F(3,0) | F(3,1) | F(3,2) | F(3,3) | F(3,4) | F(3,5) | F(3,6) | F(3,7) |
| F(4,0) | F(4,1) | F(4,2) | F(4,3) | F(4,4) | F(4,5) | F(4,6) | F(4,7) |
| F(5,0) | F(5,1) | F(5,2) | F(5,3) | F(5,4) | F(5,5) | F(5,6) | F(5,7) |
| F(6,0) | F(6,1) | F(6,2) | F(6,3) | F(6,4) | F(6,5) | F(6,6) | F(6,7) |
| F(7,0) | F(7,1) | F(7,2) | F(7,3) | F(7,4) | F(7,5) | F(7,6) | F(7,7) |

| F(0,0) | F(0,1) | F(0,2) | F(0,3) | F(0,4) | F(0,5) | F(0,6) | F(0,7) |
|--------|--------|--------|--------|--------|--------|--------|--------|
| F(1,0) | F(1,1) | F(1,2) | F(1,3) | F(1,4) | F(1,5) | F(1,6) | F(1,7) |
| F(2,0) | F(2,1) | F(2,2) | F(2,3) | F(2,4) | F(2,5) | F(2,6) | F(2,7) |
| F(3,0) | F(3,1) | F(3,2) | F(3,3) | F(3,4) | F(3,5) | F(3,6) | F(3,7) |
| F(4,0) | F(4,1) | F(4,2) | F(4,3) | F(4,4) | F(4,5) | F(4,6) | F(4,7) |
| F(5,0) | F(5,1) | F(5,2) | F(5,3) | F(5,4) | F(5,5) | F(5,6) | F(5,7) |
| F(6,0) | F(6,1) | F(6,2) | F(6,3) | F(6,4) | F(6,5) | F(6,6) | F(6,7) |
| F(7,0) | F(7,1) | F(7,2) | F(7,3) | F(7,4) | F(7,5) | F(7,6) | F(7,7) |

FIG. 7

| DC | 0 | -2 | 0 | 0 | -1 | 0 | 0 |
|----|---|----|---|---|----|---|---|
| 0  | 1 | 0  | 0 | 0 | 0  | 0 | 0 |
| 0  | 0 | 0  | 0 | 0 | 0  | 0 | 0 |
| -1 | 1 | 0  | 0 | 0 | 0  | 0 | 0 |
| 0  | 0 | 0  | 0 | 0 | 0  | 0 | 0 |
| 0  | 0 | 0  | 0 | 0 | 0  | 0 | 0 |
| 0  | 0 | 0  | 0 | 0 | 0  | 0 | 0 |
| 0  | 0 | 0  | 0 | 0 | 0  | 0 | 0 |

FIG. 8

| RUN | NONZERO VALUE | CODE WORD |
|-----|---------------|-----------|
| EOB | —             | 1 0       |
| 0   | 1             | 1 1 0     |
| 0   | -1            | 1 1 1     |
| 1   | 1             | 0 1 1 0   |
| 1   | -1            | 0 1 1 1   |
| 0   | 2             | 0 1 0 0 0 |
| 0   | -2            | 0 1 0 0 1 |
| 2   | 1             | 0 1 0 1 0 |
| 2   | -1            | 0 1 0 1 1 |
| 0   | 3             | 0 0 1 0 1 0 |
| 0   | -3            | 0 0 1 0 1 1 |
| 3   | 1             | 0 0 1 1 1 0 |
| 3   | -1            | 0 0 1 1 1 1 |
| ⋮   | ⋮             | ⋮         |

SIGNAL COMPRESSION DEVICE

BACKGROUND OF THE INVENTION

1. Field of the Invention

This invention relates to a signal compression device and a signal expansion device utilizing entropy coding for bit reduction, wherein when the code content after variable-length coding is greater than the code content of input sample data, the input sample data itself, instead of the variable-length coded data, is used as data to be compressed, to thereby reduce the average transmission code content.

2. Description of the Related Art

Nowadays a technique called entropy coding is mainly used as a bit reduction technique for digital signals. According to entropy coding, input signals are subjected to conversion such as frequency conversion and then shorter code lengths are allocated to those signals which frequently appear in terms of statistics, thereby to reduce the code content.

Specifically, based on the characteristics of signal information, especially the frequency characteristic, short codes are allocated to those symbols which frequently appear in terms of statistics whereas long codes are allocated to less frequent symbols, in order to reduce the average code content.

To implement such a data compression process, in general, pixel information about an input sample surface (two-dimensional space surface) is divided into unit blocks, which are subjected to orthogonal transformation such as discrete cosine transform (DCT) and then to quantization, and the quantized data is subjected to variable-length coding (entropy coding).

When input data is subjected to the variable-length coding, the code content can occasionally become greater than the content of the DCT-treated space surface data. For example, in the case of an impulse signal wherein only one of a plurality of DCT-treated data blocks (e.g., 64 blocks of space surface data) is nonzero while all the other data blocks are zero, all DCT coefficients of the input sample surface, that is, frequency surface data, become nonzero. This is evident from expression (1) described later.

Although such an impulse signal is rarely observed in natural images, it frequently appears in the case of superimposing characters or in an image processing system for computer graphics etc. In order to gain zero run values (mentioned later) at the time of variable-length coding when such an image is compressed, it is necessary that a larger value be set for the quantization step, which leads to an increase in the code content. Since the quantization step is large, quantization errors become conspicuous, with the result that the image quality available lowers.

OBJECT AND SUMMARY OF THE INVENTION

This invention was made to solve the problem associated with the prior art, and is capable of reducing the average code content and also lessening deterioration in the image quality.

To solve the above problem, there is provided a signal compression device according to the invention, which utilizes entropy coding for compressing data obtained by subjecting pixel information of an original sample surface to blocking and orthogonal transformation, and which is characterized in that when a variable-length code content after entropy coding is greater than a data content of unit input sample surface, input sample data itself, instead of variable-length coded data, is used as data to be compressed.

This invention concerns an encoder. When the variable-length code content after entropy coding is greater than the data content of unit input sample surface, the input sample data itself, instead of the variable-lenght coded data, is used as data to be compressed. By using the input sample data, the average code content can be reduced. Since both variable-length coded data and input sample data are contained, an identifier (i.e., noncode code) for facilitating the discrimination between the two is affixed before a data stream is created.

A signal expansion device according to the invention is characterized in that when an input bit stream contains a mixture of variable-length coded data and input sample data, the variable-length coded data is subjected to a process to be transformed into original uncompressed data, and the input sample data is used directly as uncompressed data.

This invention concerns a decoder. When the input bit stream contains a mixture of variable-length coded data and input sample data, the variable-length coded data is subjected to a process to be transformed into original uncompressed data whereas the input sample data is used directly as uncompressed data. The discrimination between the two types of data is made based on the aforementioned identifier.

Additional objects and advantages of the present invention will be apparent from the following detailed description of a preferred embodiment thereof, which is best understood with reference to the accompanying drawings.

BRIEF DESCRIPTION OF THE DRAWINGS

FIG. 4 is a diagram illustrating a DCT process and an IDCT process according to this invention;

FIG. 7 is a diagram exemplifying specific values after zigzag scan according to this invention;

FIG. 8 is a diagram showing an example of a VLC table for two-dimensional coding according to this invention;

DESCRIPTION OF THE PREFERRED EMBODIMENT

Examples of a signal compression device and a signal expansion device according to this invention will be now described in detail with reference to the drawings.

Figure 1:
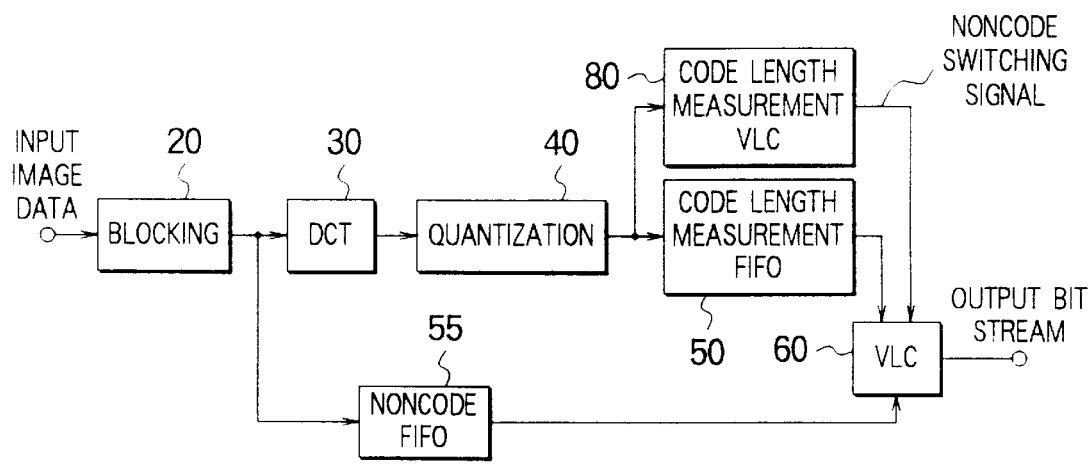
FIG. 1 is a diagram showing an example of a signal compression device according to this invention.

FIG. 1 illustrates a signal compression device 10 by way of example. The following description exemplifies bit reduction by means of discrete cosine transform (DCT) used in MPEG (Moving Picture coding Experts Group) and the like. According to MPEG, inter-frame differences are in practice obtained by motion compensation techniques; however, the following describes only an intra-picture process (intra-frame process) for simplicity of illustration.

An encoding process for this purpose typically includes a blocking process, a DCT process, a quantization process, and a variable-lenght coding (VLC) process, and the signal compression device (encoder) 10 shown in FIG. 1 comprises a blocking circuit 20, a DCT circuit 30, a quantizing circuit 40 and a variable-length coding circuit 60 corresponding to the respective processes. The individual processes will be explained with reference to the drawings.

Figure 2A:
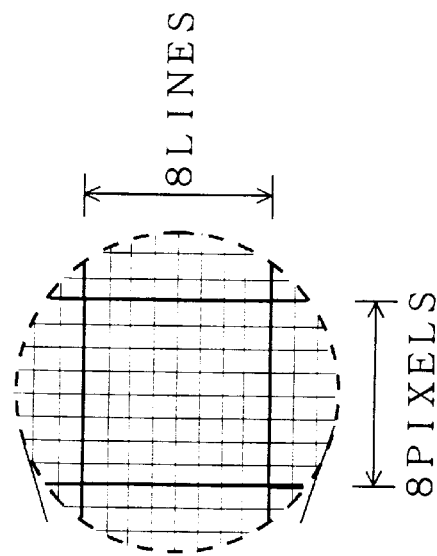
FIG. 2 is a diagram illustrating a blocking process according to this invention.
Figure 2:
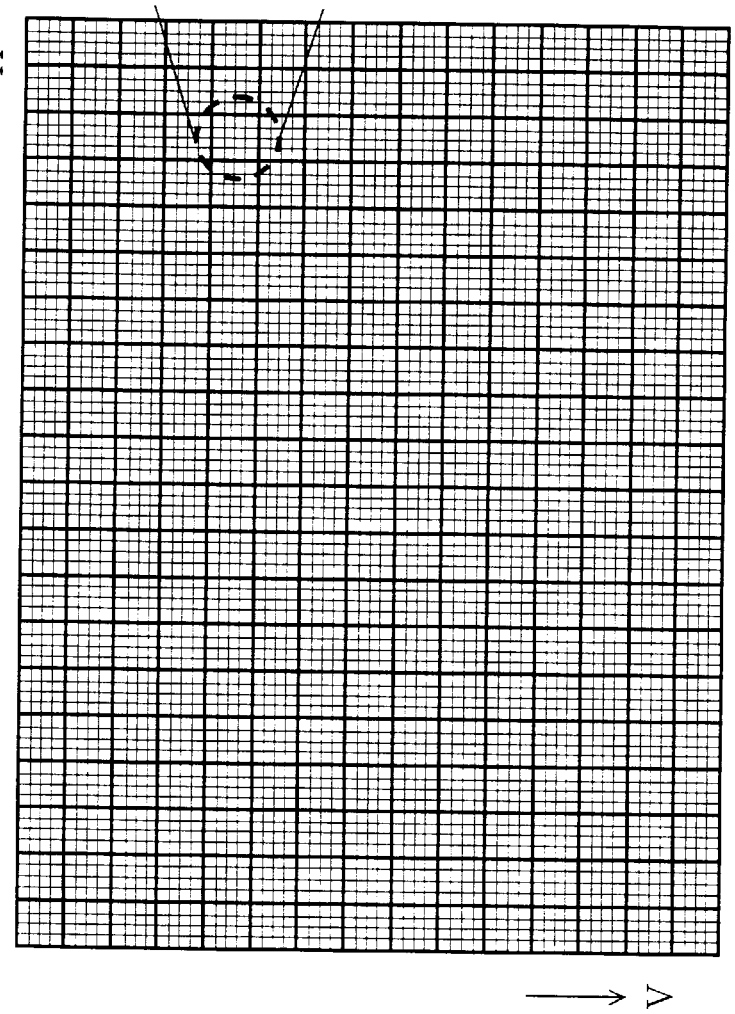

The DCT process is performed on a block of pixels with a predetermined size. A unit of processing according to JPEG (Joint Photographic coding Experts Group) or MPEG is an 8×8 pixel block. On the other hand, according to MP@ML of MPEG2, for example, an input image to be processed contains 720×480 pixels per frame, and therefore, an input image (frame data) must be subjected to a process such that it is divided into blocks (8×8 pixel blocks), as shown in FIG. 2.

Figure 3:
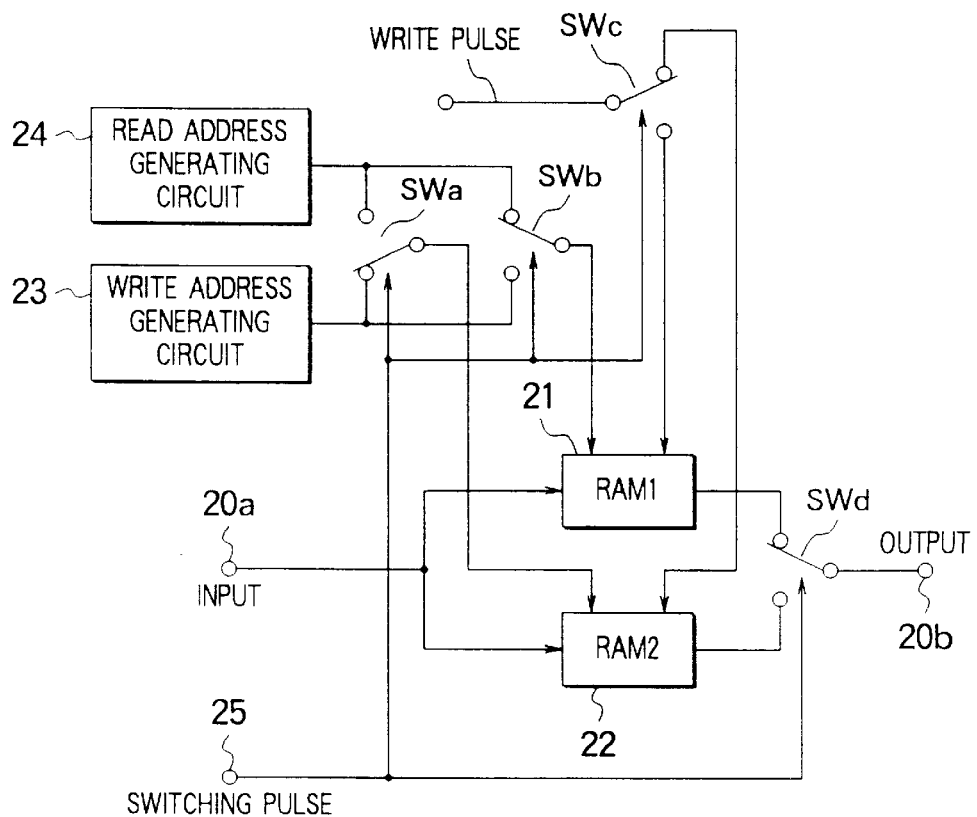
FIG. 3 is a diagram showing an example of a blocking circuit according to this invention.

An example of the blocking circuit 20 for carrying out the blocking process is shown in FIG. 3. The blocking circuit 20 includes two RAMs 21 and 22. These memories are controlled in such a manner that while one of them, for example, the RAM 22, is in write mode, the other RAM 21 is in read mode. The writing-side memory receives an address according to which raster-scanned data is to be stored therein, and the reading-side memory receives an address for constituting blocks as shown in FIG. 2. The addresses are generated by a write address generating circuit 23 and a read address generating circuit 24. These generating circuits 23 and 24 can be individually implemented by a suitable counter circuit and a ROM, as is known in the art.

While the RAM 22 is in write mode, address switches SWa and SWb are controlled so that the RAM 21 may be in read mode, and also a switch SWc for providing a write pulse (enable pulse) is controlled. Outputs from RAMs 21 and 22 also are subjected to switching by a switch SWd. These switching operations are synchronized with each other and controlled by a switching pulse supplied to a terminal 25.

DCT is applied to each of the blocks obtained by dividing the input image data. Like two-dimensional Fourier transform, DCT is a transformation from two-dimensional pixel information (space surface information) to two-dimensional frequency component information (frequency surface information). It has been known that where the individual pixels are assigned two-dimensional array variables f(*,*) as shown in FIG. 4(A), their transformation to data (DCT coefficients) F(*,*) shown in FIG. 4(B) can be achieved by arithmetic operation indicated by expression (1).

Consequently, in the array of the DCT coefficients F(*,*), their horizontal frequency component increases in the left-to-right direction and their vertical frequency component increases in the top-to-bottom direction. The vertical frequency of F(0,*) is zero, that is, DC, and the horizontal frequency of F(*,0) is zero, that is, DC. F(0,0) is DC in both horizontal and vertical frequencies and is a pixel average value of the block concerned. As seen from expression (1), since irrational numbers are involved in multiplication and addition, the DCT coefficient has a larger number of output bits than the number of bits of corresponding input image data. In MPEG, an 8-bit input dynamic range turns into a 12-bit output dynamic range. Fast algorithms etc. relating to the technique have already been made known, and therefore, description of the specific hardware configuration of the DCT circuit is omitted.

In the case of an input image like a natural image, the results of DCT show a deviation in component, due to the frequency distribution characteristics of image data. For example, most of large-amplitude data are concentrated near low-frequency components such as DC, while small values close to zero appear in high-frequency components. Coefficients other than DC coefficients, that is, AC coefficients, generally show a Laplace distribution and have a greater small-amplitude proportion. This property (output deviation) is utilized for bit reduction, and usually a quantization process is performed prior to the bit reduction.

Figures 5, 6:
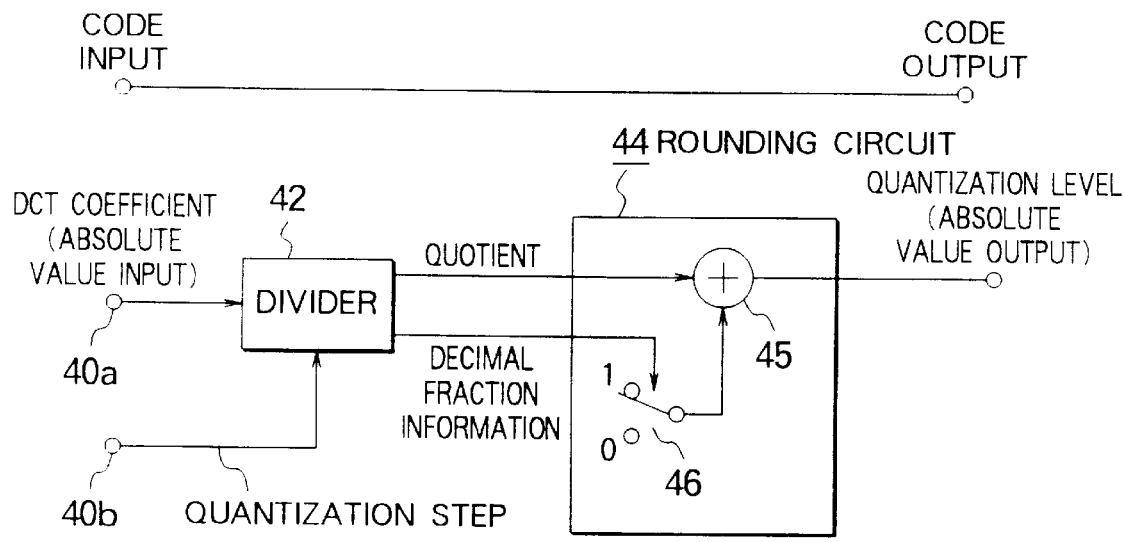
FIG. 5 is a diagram showing an example of a quantizer according to this invention.
FIG. 6 is a diagram showing an example of zigzag scan according to this invention.

Quantization designates a process of dividing the DCT coefficient by a certain number and then rounding the result. FIG. 5 shows a specific example of a quantizer 40. The quantizer 40 includes a divider 42, whereby input data (DCT coefficient: absolute value) from a terminal 40$a$ is divided by a quantization step value applied to a terminal 40$b$, the result of the division, or the quotient and decimal fraction information, being supplied to a rounding circuit 44.

In many cases, a rounding-off process is employed for the rounding. Since signed absolute values are easy to handle in division and rounding, this embodiment uses signed absolute values. Accordingly, input sign data is directly output, whereas the absolute value of the quotient is incremented by 1 at an adder 45 if the absolute value of a decimal fraction obtained as a result of the division at the divider 42 indicates 0.5 or more, and the quotient is directly output as an integer if the decimal fraction indicates a value less than 0.5. A switch 46 serves to apply the value 1 or 0 to the adder 45 and is controlled in accordance with the decimal fraction information.

In the case where an image like a natural image is subjected to quantization, zeros frequently appear as quantization levels (results of quantization) in a region corresponding to high-frequency components of DCT coefficients shown in FIG. 4(B). As a result, the code content decreases after encoding. The divisor for quantization (quantization step) is increased or decreased, as described later, to control the code content to a desired level. Increasing the quantization step can reduce the code content, but deteriorates the quality of an output image after encoding. This is because the quantization process involves quantization error and this error is proportional to the quantization step.

$$F(k1,k2) = \frac{2}{\sqrt{8 \times 8}} K_{k1}K_{k2} \sum_{n1=0}^{7} \sum_{n2=0}^{7} f(n1,n2)\cos\left(\frac{(2n1+1)k1\pi}{2 \times 8}\right)\cos\left(\frac{(2n2+1)k2\pi}{2 \times 8}\right) \quad (1)$$

$$(0 \leq n1,n2 \leq 7) \; K_k = \begin{cases} 1/\sqrt{2} & k = 0 \\ 1 & k \neq 0 \end{cases}$$

The quantization levels are subjected to variable-length coding, as shown in FIG. 1. In MPEG etc., the quantization levels other than DC are encoded (VLC) by means of two-dimensional coding which is a combination of zero run and entropy coding. Two-dimensional DCT coefficients are subjected to zigzag scanning, as shown in FIG. 6, to be rearranged into one-dimensional data as follows: F(0,1), F(1,0), F(2,0), F(1,1), F(0,2), F(0,3), F(1,2), . . . F(5,7), F(6,7), F(7,6), F(7,7)

Sequences of zeros appear as a result of zigzag scan, as shown in FIG. 7, and the numbers of consecutive zeros are subjected to coding, that is, zero run coding. Zero run coding permits efficient compression.

Since an image like a natural image has an output deviation such that there is high probability of occurrences of small-amplitude nonzero components, entropy coding is used for encoding data. In entropy coding, smaller-amplitude data are assigned shorter code words and larger-amplitude data are assigned longer code words.

The number of consecutive zeros and the subsequent nonzero value are subjected to entropy coding. FIG. 8 shows an example of a VLC table used for two-dimensional coding. The VLC table is created based on statistical data of a natural image or the like. EOB indicates that "this coefficient is followed by no nonzero values up to the end of the zigzag scan." In the case where the quantization levels have the data values shown in FIG. 7, data obtained after the zigzag scan is in the following sequence:

"0,0,0,1,−2,0,0,0,−1,0,1,0,0,0,−1,0,0,0,0,0,0,0,0,0,0,0, 0,0,0,0,0,0,0,0, 0,0,0,0,0,0,0,0,0,0,0,0,0,0,0,0,0,0,0,0, 0,0,0,0,0,0,0"

This sequence is expressed by means of symbols (run, nonzero value), then

"(3,1), (0,−2), (3,−1), (1,1), (3,−1), (EOB)".

Using the VLC table, these symbols are expressed in binary notation, then

"001110 01001 001111 0110 001111 10".

This sequence is divided into 8-bit segments with the MSB set as the first bit, and then expressed in hexadecimal notation, "3927b1f0"

thus obtaining a bit stream.

Figure 9:
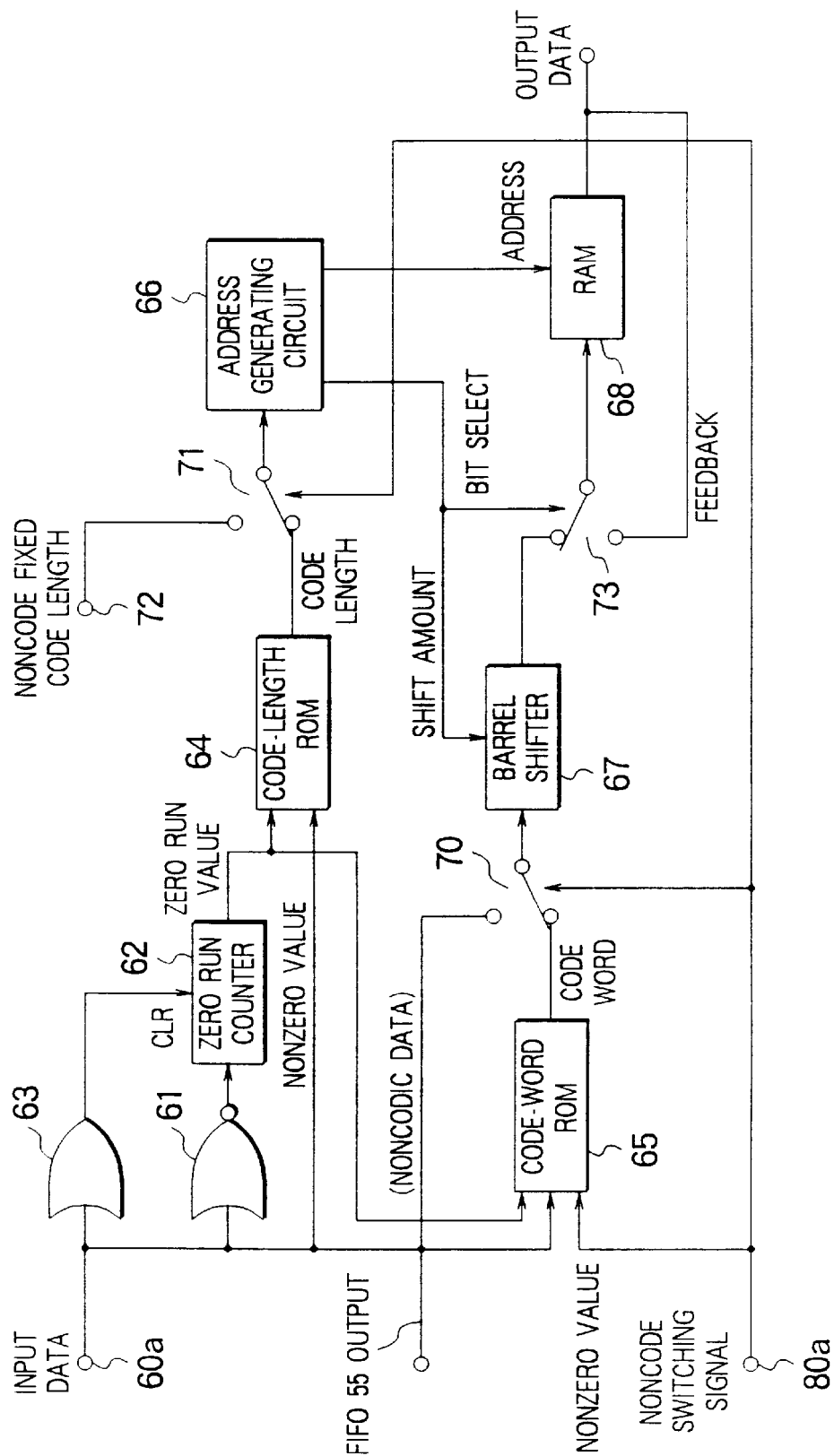
FIG. 9 is a diagram showing an example of a variable-length coding circuit according to this invention.

FIG. 9 shows a specific example of the variable-length coding circuit (VLC circuit) 60 for carrying out the variable-length coding process described above.

In FIG. 9, a zero run counter 62 serves to count the number of consecutive zero-events in the input data (quantization levels), and its count is cleared synchronously with the occurrence of a nonzero value in the input data. Namely, the zero run counter counts up in response to input data supplied from a NOR circuit 61, and is cleared by input data supplied from an OR circuit 62. Consequently, the "zero run values" output from the zero run counter 62 and the input data per se constitute two-dimensional events.

The two-dimensional events are supplied to two ROMs 64 and 65; the code-length ROM 64 outputs code lengths of the two-dimensional events, and the code-word ROM 65 outputs code words of the two-dimensional events after bit stuffing. The code-length data is input to an address generating circuit 66.

The address generating circuit 66 outputs an accumulated value of the code-length data as address data. For the address generating circuit 66, circuitry including a suitable accumulator and employing simple logic may be used, though not shown.

The addressing of a RAM 68 and the shift amount of a barrel shifter 67 are controlled by the address data. The barrel shifter 67 shifts the code word output from the code-word ROM 65 in such a manner that the beginning of a current code word is continuous with the end of an immediately preceding code word.

The RAM 68 is used for the purpose of read-modify-write. Specifically, the current code word of which the head is known and RAM data indicative of the address at which the immediately preceding code word is written are fed back and subjected to bit-by-bit selection. Namely, the bits occupied by the immediately preceding code are switched to the feedback side, and the other bits are switched to the side of the code-word ROM 65. In this manner, current VLC data which is continuous with the immediately preceding code is written in the RAM 68.

This process is repeated up to EOB, so that an encoded bit stream is stored in the RAM 68, and the contents of the RAM 68 are sequentially read out afterwards to obtain an output bit stream.

As mentioned above, the code content after variable-length coding can be greater than the input sample data content, depending on the input image to be processed. In such a case, according to this invention, the code content after variable-length coding and the input sample data content are compared with each other in respect of size on a block-by-block basis, taking account of the possibility of an average code content increasing, and when the code content after variable-length coding exceeds the input sample data content, the input sample data itself (uncompressed raw data, i.e., noncodic data with a fixed length) is used as transmission data.

Consequently, the bit stream constituting transmission data contains a mixture of codic data (block data which has been subjected to (DCT+Quantization+VLC)) and fixed-length noncodic data, and is multiplexed with an identifier (hereinafter noncode code) for distinguishing the two types of data from each other.

It is here assumed that the code length of the noncode code is A bits, the number of samplings of block data is 8×8=64, and that the input sample data is 8 bits. In this case, the code lengths after variable-length coding are monitored at all times, and if a code length X satisfying the relationship

X>A+64×8 is detected, noncodic data (input sample data) (=64×8 bits) is transmitted together with noncode code A. The noncode code A may be assigned a suitable number of bits equal to or greater than 1 bit.

To implement the process described above, a VLC code-length measuring circuit 80 is arranged at a stage preceding the variable-length coding circuit 60, as shown in FIG. 1. The variable-length coding circuit 60 is supplied with quantization levels via a time-matching register 50 and also with block data (noncodic data) from the blocking circuit 20 via another time-matching register 55. The register 50 serves to delay the input data until code-length measurement by the measuring circuit 80 is completed, and the register 55 adjusts its timing with respect to the data output from the register 50.

In response to the noncode process, the variable-length coding circuit 60 performs a switching between noncodic data and codic data and multiplexes the noncode code A. To operate in response to the noncode process, the variable-lenght coding circuit 60 has a plurality of switches 70 and 71, as shown in FIG. 9. A terminal 80a is supplied with a noncode switching signal output from the measuring circuit 80. A terminal 72 is supplied with a fixed-length code. When the variable-length code has a large length, the noncode code A from the code-word ROM 65 is selected by the switch 70, and on the side of the code-length ROM 64, the fixed code length for noncode is selected by the switch 71. Noncodic data output from the register 55 is selected by the switch 70.

Figure 10:
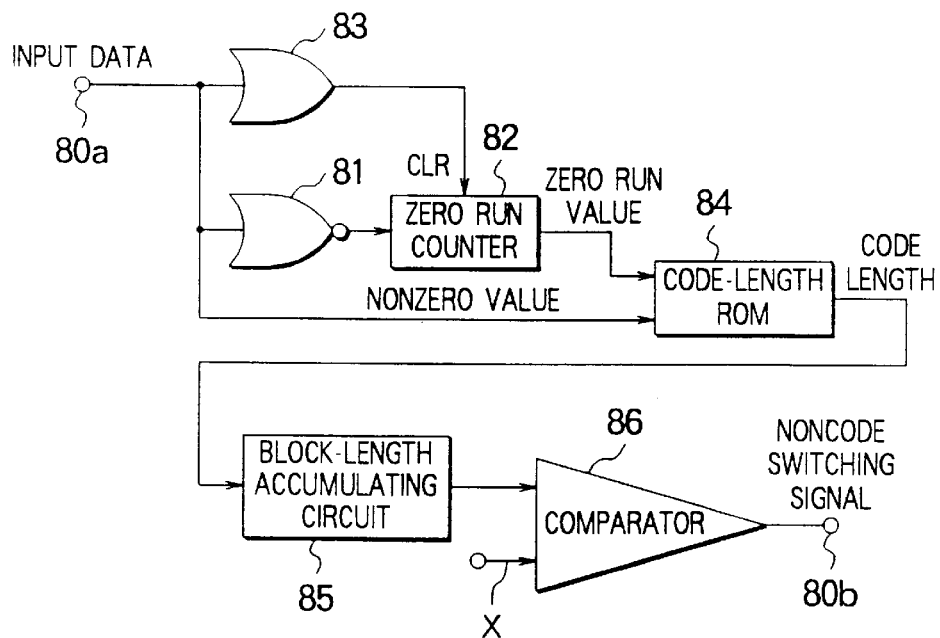
FIG. 10 is a diagram showing an example of a variable code length measuring circuit according to this invention.

FIG. 10 shows a specific example of the aforementioned variable code length measuring circuit 80. The measuring circuit 80 also is provided with a zero run counter 82, which counts up in response to the output from a NOR circuit 81 and is reset by the output from an OR circuit 83, thereby obtaining a zero run value. This zero run value and nonzero value are supplied to a code-length ROM 84, wherein the code length of input data is computed. Data indicative of the code length is accumulated in a block-length accumulating circuit 85, the value of which is then compared with criterion X at a comparator 86, and the result of the comparison is used as the noncode switching signal.

Figure 11:
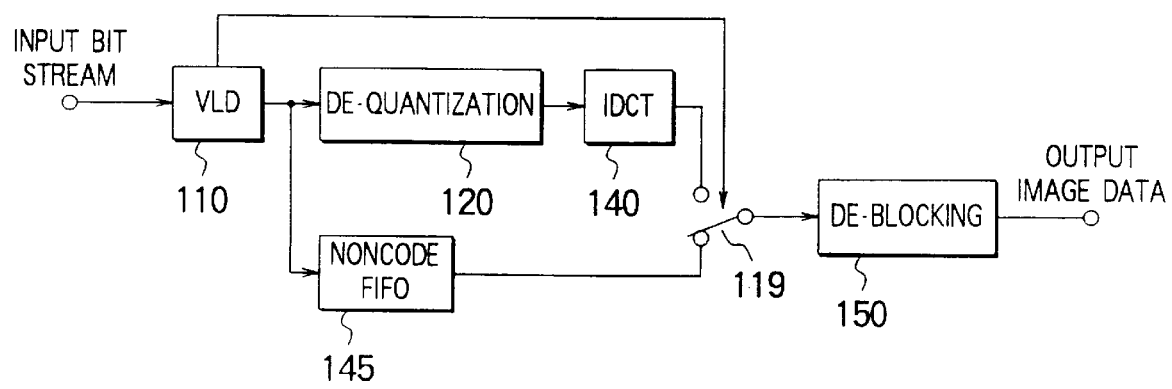
FIG. 11 is a diagram showing an example of a signal expansion device to which this invention is applied.

FIG. 11 and subsequent drawings illustrate a processing system for decoding data from a bit stream containing a mixture of codic data and noncodic data. FIG. 11 shows a specific example of a signal expansion device (decoder) 100 applicable to this invention.

In cases where a noncode code is detected in the bit stream on the decoding side, data is output directly as sample data without carrying out an ordinary decoding process, so that the subsequent bit stream can be decoded.

To this end, the input bit stream is decoded by a variable-length decoding circuit (VLD circuit) 110, as shown in FIG. 11, and if the decoded data is ordinary data (codic data), it is supplied via a de-quantizer 120 to an inverse discrete cosine transform circuit (IDCT circuit) 140 in which the data is transformed to space-surface block data.

On the other hand, if the data is noncodic data, it is delayed by a FIFO-configured register 145 for a predetermined time period corresponding to the normal process mentioned above, and then supplied to a selector 119.

When the noncode code A is detected by the VLD circuit 110, the selector 119 is shifted to the noncode side, whereby the block data transmitted in noncode mode is supplied to a de-blocking circuit 150. When no noncode code A is detected, the selector 119 is switched to the normal processing system, and the results from the normal processing system are introduced to the de-blocking circuit 150.

In the VLD circuit 110 is reproduced post-quantization data. To explain this with reference to the aforementioned example, the VLD circuit outputs "0,0,0,1,−2,0,0,0,−1,0,1,0,0,0,−1,0,0,0,0,0,0,0,0,0,0,0, 0,0,0,0,0,0,0, 0,0,0,0,0,0,0,0,0,0,0,0,0,0,0,0,0,0, 0,0,0,0,0,0,0"

which is the data obtained by performing a zigzag scan on the input

"3927b1f0".

Figure 12:
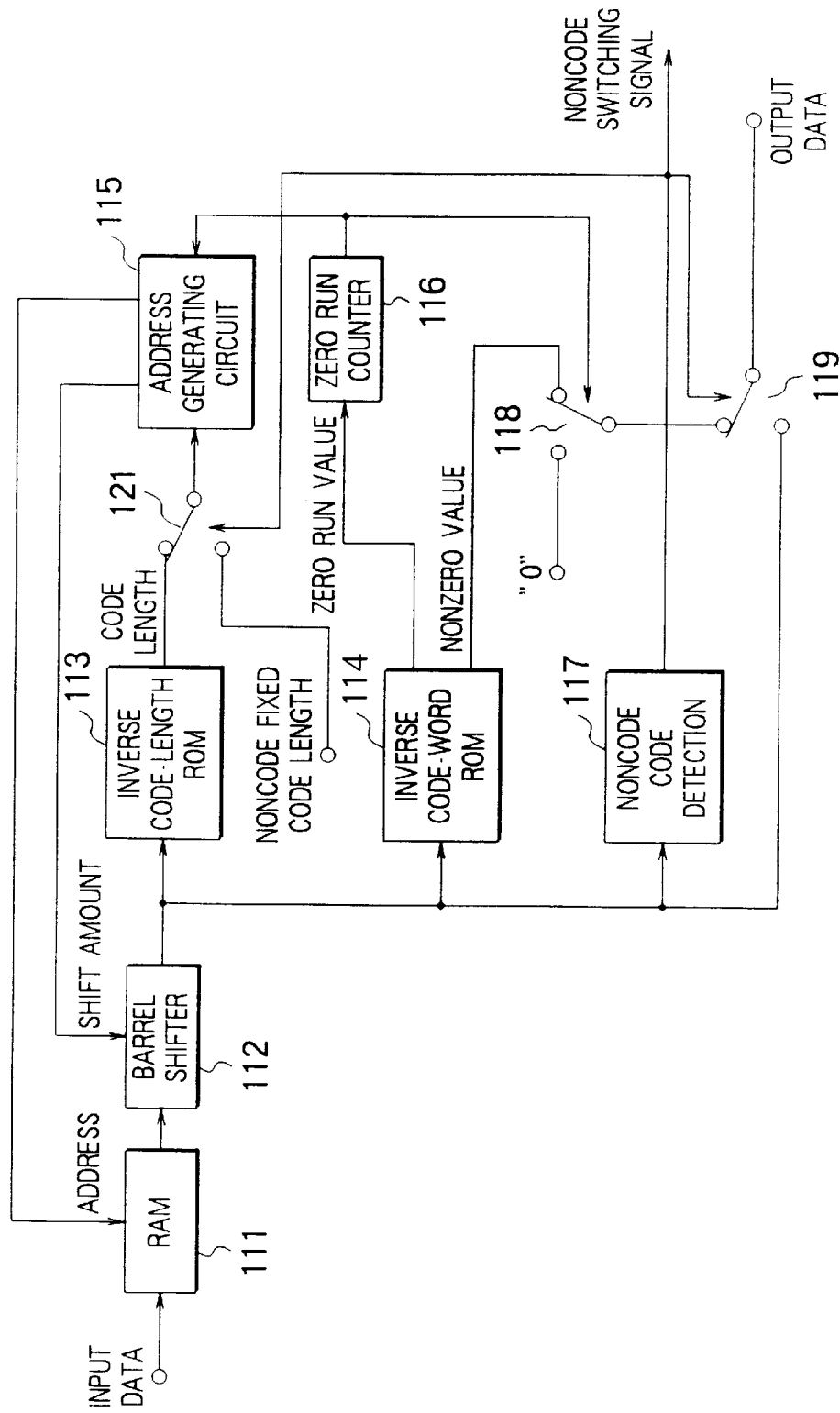
FIG. 12 is a diagram showing an example of a variable-length coding circuit according to this invention.

FIG. 12 shows an example of the VLD circuit 110. Input data is stored in a RAM 111. Since the data is decoded code word by code word, an address of a code word to be currently decoded is obtained, and therefore, it supplies the head position to a barrel shifter 112 wherein the head of the code word to be currently decoded is located. The code word whose head has thus been located is supplied to two ROMs 113 and 114. The ROM 113 is an inverse code-length ROM for outputting the code length based on the code word, and the other ROM 114 is an inverse code-word ROM for outputting the zero run value and the nonzero value, which are two-dimensional events, based on the code word.

The code length of a current code word is obtained by the inverse code-length ROM 113 and then applied to the address generating circuit 115. The address generating circuit 115 computes the address for a subsequent code word in the RAM 111, as well as the shift amount for the barrel shifter 112. The zero run value obtained by the inverse code-word ROM 114 is loaded in a zero run counter 116, and a selector 118 is shifted to the "0" side until the count of the counter 116 is decremented to 0, so that zeros corresponding in number to the zero run value are output.

When the count of the zero run counter 116 becomes zero, the selector 118 is shifted to the "1" side, and the nonzero value output from the inverse code-word ROM 114 is selected and output. While the zero run counter 116 is in operation, the address circuit 115 is controlled by the output of the zero run counter 116 so that it may not operate.

On the other hand, when the presence of a noncode code A is detected by a noncode code detecting circuit 117, it is judged that the subsequent data blocks are all fixed-length data, whereupon a switch 121 is shifted so that the fixed code length (fixed value) may be supplied to the address generating circuit 115. Simultaneously with this, the switch 118 is shifted to the barrel shifter 112 side, and thus the barrel shifter output is directly output. Namely, the noncodic data is selected.

The noncode code detecting circuit 117 is designed to be cleared for each block, and once a noncode code is detected, the noncode process is continued up to the end of the block concerned.

Figure 13:
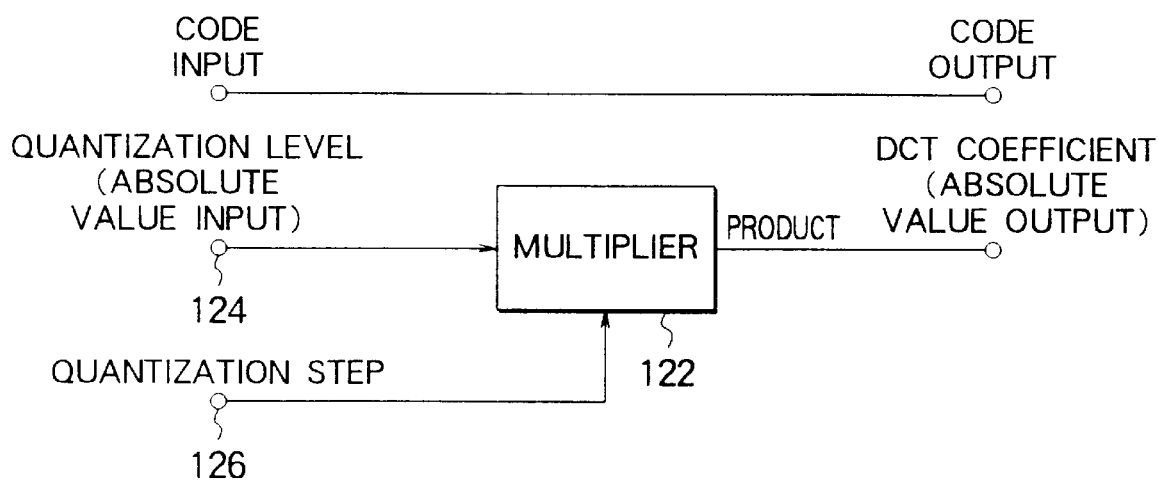
FIG. 13 is a diagram showing an example of a de-quantizer according to this invention.

De-quantization is a process opposite to the quantization performed on the encoding side. A de-quantized output can be obtained by multiplying the output from the VLD circuit 110 by the quantization step. FIG. 13 shows a specific example of the de-quantizing circuit 120 which is constituted by a multiplier 122 alone. Decoded quantization data (absolute value data) is supplied from a terminal 124 and then multiplied by the quantization step supplied from a terminal 126, thereby obtaining de-quantized data.

IDCT is a process opposite to the DCT process, and based on the block data which is frequency surface information, space surface block data is obtained by this process. The IDCT process can be implemented by arithmetic operation indicated by expression (2).

$$f(n1,n2) = \frac{2}{\sqrt{8 \times 8}} \sum_{k1=0}^{7} \sum_{k2=0}^{7} K_{k1} K_{k2} F(k1,k2) \cos\left(\frac{(2n1+1)k1\pi}{2 \times 8}\right) \cos\left(\frac{(2n2+1)k2\pi}{2 \times 8}\right) \quad (2)$$

$$(0 \leq n1, n2 \leq 7) K_k = \begin{cases} 1/\sqrt{2} & k = 0 \\ 1 & k \neq 0 \end{cases}$$

currently decoded is obtained by an address generating circuit 115 based on the total code length decoded so far, and the address value is applied to the RAM 111. Based on the total code length decoded so far, the address generating circuit 115 can identify the head position of the code word De-blocking is a process for reconstructing frame data from the block data, whereby reproduced image data can be obtained.

The process described above is not readily applicable to the coding for MPEG or the like currently used. The reason is that the aforementioned noncode code is not defined with respect to bit streams, and such definition is not permissible from the viewpoint of compatibility. Therefore, the bit stream obtained by the aforementioned process is a bit stream with new format.

The following describes modifications of the process described above.

1. In the foregoing description, whether data is to be compressed or not is determined for each of DCT blocks, but the determination may be made for each of macro blocks, slices, or pictures.

2. In the foregoing is described intra-process, but the invention can be applied to inter-process (inter-frame process) as is called in MPEG etc.

3. In the above description, bit reduction of picture signals is explained, but the orthogonal transformation process, that is, transform coding, is explained, the invention can be applied to any bit reduction that utilizes entropy coding.

5. In the foregoing description, the encoding side (compression device side) includes a blocking process, but the blocking process and the de-blocking process maybe omitted as required.

As described above, in the signal compression/expansion process utilizing entropy coding-based bit reduction, this invention is characterized in that, when a code content exceeds a certain value, input data itself is transmitted, whereby the average code length can be shortened and the transmission efficiency is improved. This invention is, therefore, extremely suitably applicable to a device for compressing/expanding images etc.

It will be obvious to those having skill in the art that many changes may be made in the above-described details of the preferred embodiment of the present invention. The scope of the present invention, therefore, should be determined according to the following claims.

What is claimed is:

1. A signal compression device for compressing image data, comprising:

orthogonal transformation means for transforming input image data into orthogonally transformed data corresponding to said input image data;

quantizing means for quantizing the orthogonally transformed data using a predetermined quantization step value;

measuring means including first variable-length coding means for variable-length coding the quantized data for determining a value that indicates a code length of the variable-length coded data, said measuring means including means for comparing the determined value to a predetermined value that indicates a code length of said input image data, said measuring means including means for supplying data indicating whether the determined value is larger than said predetermined value;

second variable-length coding means for variable-length coding the quantized data received from said quantizing means; and output means for selectively transmitting the variable-length coded data received from said second variable-length coding means or said input image data as output data in response to said measuring means.

2. The signal compression device according to claim 1, wherein said orthogonal transformation means includes discrete cosine transformation means.

3. The signal compression device according to claim 1, further comprising means for generating an identifier for distinguishing between the variable-length coded data and said input image data.

4. The signal compression device according to claim 3, wherein said identifier is represented by non-code data, said signal compression device further comprising means for multiplexing said non-code data with said output data if said output data includes said input image data.

5. The signal compression device according to claim 3, wherein said output means transmits said input image data as said output data if the determined value is larger than a sum of said predetermined value and a value that indicates a code length of said identifier.

6. The signal compression device according to claim 1, further comprising means for arranging said input image data into at least one unit being one of a DCT block, a macro block, a slice and a picture of said image data.

7. A signal expansion device for expanding compressed image data having been obtained by orthogonally transforming input image data into orthogonally transformed data, by quantizing the orthogonally transformed data, by variable-length coding the quantized data for determining a value that indicates a code length of the variable-length coded data, by comparing the determined value to a predetermined value that indicates a code length of said input image data, by supplying data indicating whether the determined value is larger than said predetermined value, and by selectively transmitting as the compressed image data the variable-length coded data or said input image data based on the supplied data, said signal expansion device comprising:

variable-length decoding means for receiving the compressed image data and for generating a code indicating whether the received image data contains the variable-length coded data or said input image data, said variable-length decoding means selectively decoding the variable-length coded data or passing said input image data unmodified;

de-quantizing means for de-quantizing the decoded data;

inverse transformation means for transforming the de-quantized data into said input image data; and selecting means for selecting said input image data from said inverse transformation means or said variable-length decoding means based on the generated code received from said variable-length decoding means.

8. The signal expansion device according to claim 7, wherein the compressed image data includes an identifier for distinguishing between the variable-length coded data and said input image data, said variable-length decoding means including identifier detecting means for detecting whether the received image data contains the variable-length coded data or said input image data based on said identifier.

* * * * *